US009588478B1

(12) United States Patent
Fan

(10) Patent No.: US 9,588,478 B1
(45) Date of Patent: Mar. 7, 2017

(54) DRIVE COUPLING AND TRANSMITTING ASSEMBLY FOR PHOTOSENSITIVE DRUM AND TONER CARTRIDGES

(71) Applicant: Roy Fan, Arcadia, CA (US)

(72) Inventor: Roy Fan, Arcadia, CA (US)

( * ) Notice: Subject to any disclaimer, the term of this patent is extended or adjusted under 35 U.S.C. 154(b) by 0 days.

(21) Appl. No.: 15/282,786

(22) Filed: Sep. 30, 2016

(51) Int. Cl.

| | |
|---|---|
| ***G03G 15/00*** | (2006.01) |
| ***G03G 21/16*** | (2006.01) |
| ***F16D 1/10*** | (2006.01) |

(52) U.S. Cl.
CPC .......... *G03G 15/757* (2013.01); *F16D 1/101* (2013.01); *G03G 21/1647* (2013.01)

(58) Field of Classification Search
CPC ....... F16H 55/12; A61B 17/068; F16D 1/101; G03G 15/757; G03G 21/1647
See application file for complete search history.

(56) References Cited

U.S. PATENT DOCUMENTS

| | | | | |
|---|---|---|---|---|
| 5,395,188 | A | 3/1995 | Bailey et al. | |
| 5,499,984 | A | 3/1996 | Steiner et al. | |
| 6,305,867 | B1 * | 10/2001 | Schweigert | A01D 34/90 30/296.1 |
| 7,347,124 | B1 | 3/2008 | Kravitch | |
| 7,885,575 | B2 | 2/2011 | Batori et al. | |
| 8,280,278 | B2 | 10/2012 | Ueno et al. | |

(Continued)

FOREIGN PATENT DOCUMENTS

| | | |
|---|---|---|
| DE | 1806131 A1 | 10/1969 |
| EP | 1195651 | 4/2002 |

(Continued)

OTHER PUBLICATIONS

Extended European Search Report dated Jun. 23, 2016, issued in Application No. 12827257.2.

*Primary Examiner* — Francis Gray
(74) *Attorney, Agent, or Firm* — Fox Rothschild LLP

(57) ABSTRACT

A drive coupling and transmitting assembly for photosensitive drum and toner cartridges is disclosed. The assembly includes a drive shaft configured in a printer to transmit a rotational driving force and a coupling member. The coupling member includes a main drum body and a bushing member. Main drum body has a flexible shaft subassembly including a receiver, an adapter, and a flexible shaft member extended between adapter and receiver such that a first end of flexible shaft member is secured to a receiver post and a second end of flexible shaft member is secured to an upper end of adapter. The bushing member is slidably disposed between main drum body and flexible shaft subassembly. Adapter is slidably disposed in bushing member and configured with at least one rotational force transmitting pin to engage with a spiral groove disposed on bushing member such that bushing member is moved longitudinally inward or outward while rotational force transmitting pin is rotated by drive shaft or a compression and torsion spring in the spiral groove in a clockwise or counterclockwise direction. Receiver is configured to receive the rotational driving force from drive shaft and transmit the rotational driving force through flexible shaft member to adapter such that main drum body, bushing member and flexible shaft subassembly are rotated about an axis.

24 Claims, 9 Drawing Sheets

(56) References Cited

U.S. PATENT DOCUMENTS

| | | | | |
|---|---|---|---|---|
| 8,615,184 | B2 | 12/2013 | Zhou et al. | |
| 8,630,564 | B2 | 1/2014 | Ueno et al. | |
| 8,644,733 | B2 | 2/2014 | Peng et al. | |
| 8,676,090 | B1 | 3/2014 | Ueno et al. | |
| 8,682,215 | B1 | 3/2014 | Ueno et al. | |
| 8,688,008 | B2 | 4/2014 | Norioka et al. | |
| 8,731,435 | B2 | 5/2014 | Xu | |
| 8,909,102 | B2 | 12/2014 | Morgan | |
| 9,170,549 | B2 | 10/2015 | Wang | |
| 9,176,467 | B2 | 11/2015 | Gu et al. | |
| 9,486,126 | B2 * | 11/2016 | West | A61B 1/018 |
| 2003/0059233 | A1 | 3/2003 | Jang et al. | |
| 2008/0152388 | A1 | 6/2008 | Ueno et al. | |
| 2009/0317134 | A1 | 12/2009 | Miyabe et al. | |
| 2011/0159970 | A1 * | 6/2011 | Okabe | G03G 21/1864<br>464/169 |
| 2011/0217073 | A1 | 9/2011 | He | |
| 2012/0275824 | A1 | 11/2012 | Gu et al. | |
| 2013/0084129 | A1 | 4/2013 | Ikeda | |
| 2013/0240596 | A1 | 9/2013 | Whitman | |
| 2013/0308981 | A1 * | 11/2013 | Harayama | F16C 17/02<br>399/167 |
| 2014/0041476 | A1 | 2/2014 | Huang et al. | |
| 2014/0119778 | A1 | 5/2014 | Morgan | |
| 2014/0165761 | A1 | 6/2014 | Ishio et al. | |
| 2015/0030353 | A1 | 1/2015 | Wang | |
| 2015/0185693 | A1 * | 7/2015 | Wang | G03G 21/186<br>399/111 |

FOREIGN PATENT DOCUMENTS

| | | | |
|---|---|---|---|
| EP | 1359474 | A1 | 11/2003 |
| JP | 2011237734 | A * | 11/2011 |
| JP | 5471802 | B2 * | 4/2014 |

* cited by examiner

DRIVE COUPLING AND TRANSMITTING ASSEMBLY FOR PHOTOSENSITIVE DRUM AND TONER CARTRIDGES

TECHNICAL FIELD

The present invention relates to the field of electrostatographic image forming devices such as copiers, facsimile machines, electrophotography printers, and replaceable or changeable cartridges for these devices, for example, a toner cartridge for a laser printer, and more particularly, to the mechanical transmission of rotational force from a drive mechanism coupled to another rotational device used in such electrostatographic image forming devices.

BACKGROUND

Many electrophotographic machines, such as photocopiers or laser printers, use a detachable developer cylinder that contains a photosensitive member. The cylinder is also known as a cartridge or developer cartridge, and it is detachably mounted to the complete copier or printer. This construction enables users to maintain the printing capability of the device without the aid of a serviceman.

The developer cylinder is coupled to a drive mechanism that rotates the cartridge. U.S. Pat. No. 7,885,575 to Batori et al., which is incorporated by reference into this disclosure, describes an exemplary assembly for attaching the developer cylinder to the drive mechanism of the machine. As illustrated in the figures of Batori et al. and utilizing the reference numbers thereof, a drive shaft 100 of the main assembly side and a coupling member 156, which is a rotational force transmitting portion of the cartridge 2, connect with each other in interrelation with the mounting operation of the cartridge 2. By this, the drum 20 receives the rotational force from the main assembly 1 to rotate.

The drive shaft 100 is coupled with the drive transmitting means, such as a gear train and the motor provided in the main assembly 1. The free end portion 100a of the drive shaft 100 has a substantial semispherical shape and is provided with rotational force transmitting pins as the rotational force applying portion 100b.

The coupling member 156 has a rotational force receiving member 150, which includes a rotational force receiving portion 150e for receiving the rotational force at the free end portion thereof. In addition, the coupling member 156 has a spherical portion 160 mounted by penetrating the pin 155 through a rear end portion of the rotational force receiving member 150. The rotational force receiving member 150 is fabricated from a resin material, polyacetal, the polycarbonate, PPS, or the like. However, in order to enhance the rigidity of the rotational force receiving member 150, glass fibers, carbon fibers, and/or the like may be mixed in the resin material in response to the required torque load. The rigidity may further be enhanced by inserting a metal member material in the resin material, and the whole rotational force receiving member 150 may be made of metal or the like. The free end of the rotational force receiving member 150 is provided with a plurality of drive receiving projections 150d.

To facilitate coupling of the drive shaft 100 with the coupling member 156, the rigid coupling member 156 is pivoted about the pin 155 such that the rotational force receiving member 150 and the drive receiving projections 150d may be aligned with the drive shaft free end portion 100a and the force transmitting pins 100b. The pivot assembly (universal joint) may get stuck when installing a cartridge into the printer.

Moreover, U.S. Pat. No. 8,731,435 to Xu, which is incorporated by reference into this disclosure, discloses a complex control mechanism in an attempt to facilitate alignment between the drive shaft and the coupling member. As illustrated in the figures of Xu and utilizing the reference numbers thereof, the control mechanism 20 includes a control rod 15, which can rotate around a pivot on the cartridge casing, and an elastic means 14 mounted on the control rod. The control mechanism 20 is intended to control extension and retraction of the force receiving head 2 in the photosensitive drum driving assembly. While the control mechanism is intended to prevent the force receiving head from becoming stuck by a driving head 40 of the imaging device, the assembly is too complicated to reliably achieve the coupling function.

Further, U.S. Pat. No. 8,615,184 to Zhou et al., which is incorporated by reference into this disclosure, discloses a retractable shaft coupling in an attempt to facilitate alignment between the drive shaft and the coupling member. As illustrated in the figures of Zhou et al. and utilizing the reference numbers thereof, the driving component 1 includes a gear 2 having one fixed end and a longitudinal regulating component 11 having a rotational driving force receiver 3 outside the other end projecting from the gear 2. The longitudinal regulating component 11 can make a limited longitudinal and reciprocally translational movement along the longitudinal direction Z of the gear 2 relative to the gear 2 via the compressed force of the helical compression spring 8, the restoring force after losing the external force from the helical compression spring 8 and the longitudinal position limit from the position limit clevis pin 7. The longitudinal regulating component permits only axial displacements and does not permit angular misalignment and may get stuck when detaching a cartridge from the printer.

Accordingly, there is a need for a coupling and transmitting assembly that has a simple structure, facilitates installation and detaching of the cartridge, provides reliable transmission between the coupled components, and avoids the disadvantages of the known coupling and transmitting assemblies.

SUMMARY

In a first aspect, there is provided herein a drive coupling and transmitting assembly. The assembly includes a drive shaft configured in a printer to transmit a rotational driving force and a coupling member. The coupling member includes a main drum body and a bushing member. The main drum body of variable size and shape has a flexible shaft subassembly including a receiver having at least two engaging teeth, an adapter, and a flexible shaft member extended between the adapter and the receiver such that a first end of the flexible shaft member is secured to a receiver post and a second end of the flexible shaft member is secured to an upper end of the adapter. The bushing member is slidably disposed between the main drum body and the flexible shaft subassembly. The adapter is slidably disposed in the bushing member and is configured with at least one rotational force transmitting pin to engage with a spiral groove disposed on the bushing member such that the bushing member is moved longitudinally inward or outward while installing or detaching the main drum body and the rotational force transmitting pin is rotated by the drive shaft or a compression and torsion spring in the spiral groove in a clockwise or counterclockwise direction. The receiver is configured to receive the rotational driving force from the drive shaft and transmit the rotational driving force through the flexible shaft member to the adapter such that the main drum body, the bushing member and the flexible shaft subassembly are rotated about an axis.

In certain embodiments, the adapter is configured to transmit the rotational driving force to the bushing member when the at least one rotational force transmitting pin is rotated by the drive shaft and is slid to an upper end of the spiral groove.

In certain embodiments, the main drum body and the bushing member are connected by a plurality of straight, non-tapered, interval, longitudinal spline grooves and a plurality of straight, non-tapered, interval, longitudinal splines configured to slide axially to each other and transmit the rotational driving force about the axis.

In certain embodiments, the plurality of straight, non-tapered, interval, longitudinal spline grooves and the plurality of straight, non-tapered, interval, longitudinal splines connecting the main drum body and the bushing member have a free rotating angle $\alpha$ in which $\alpha$ is from 0° to less than or equal to 90°.

In certain embodiments, the main drum body is continually moved toward the drive shaft and a drive shaft free end is configured to push the receiver together with the flexible shaft subassembly and the bushing member configured to press the compression and torsion spring longitudinally inward during installation.

In certain embodiments, the receiver of the main drum body is configured to engage the drive shaft upon completion of installation.

In certain embodiments, the adapter is rotated by the drive shaft in a clockwise direction and the bushing member is rotated first in a free rotating angle $\alpha$ when the plurality of straight, non-tapered, interval, longitudinal splines of the bushing member are in communication with the plurality of straight, non-tapered, interval, longitudinal spline grooves of the main drum body during working operation of a printer.

In certain embodiments, the at least one rotational force transmitting pin is configured to slide from a lower end of the spiral groove and pull the bushing member inward until the at least on rotational force transmitting pin is stopped by an upper end of the spiral groove such that an upper hole of the bushing member disengages the receiver post and the drive shaft transmits the rotational driving force through the flexible shaft subassembly and the bushing member to the main drum body during working operation of a printer.

In certain embodiments, the main drum body is configured to be moved outward and detached from the drive shaft such that a drive shaft free end pushes the receiver together with the flexible shaft subassembly and the bushing member pressing the compression and torsion spring longitudinally inward during detachment.

In certain embodiments, the receiver is configured to swing an angle from 0° to 10° degrees thereby producing a longitudinal force configured to push the receiver together with the flexible shaft subassembly and the bushing member configured to press the compression and torsion spring longitudinally inward during detachment.

In certain embodiments, the main drum body is part of a photosensitive drum.

In certain embodiments, the photosensitive drum is part of a toner cartridge.

In certain embodiments, the flexible shaft member is made of an elastic or elastomeric material selected from metal wire, cross-linked latex rubber, cross-linked synthetic elastomers, non-cross-linked synthetic elastomers, natural rubber, thermoplastic elastomers, PVC, synthetic rubber, polyurethane, latex rubber, synthetic latex rubber, and polyolefins.

In a second aspect, there is provided herein a drive coupling and transmitting assembly. The assembly includes a drive shaft configured in a printer to transmit a rotational driving force and a coupling member. The coupling member includes a main drum body, a guide plate, and a bushing member. The main drum body of variable size and shape has a flexible shaft subassembly including a receiver having at least two engaging teeth, an adapter, and a flexible shaft member extended between the adapter and the receiver. A first end of the flexible shaft member is secured to a receiver post and a second end of the shaft member is secured to an upper end of the adapter. A guide plate is mounted on a bearing frame of the main drum body. A bushing member is slidably disposed between the main drum body and the flexible shaft subassembly. The adapter is slidably disposed in the bushing member and configured with at least one rotational force transmitting pin to engage with an axial straight and spiral groove disposed on the bushing member and configured with a W shape plate spring connection controller such that the bushing member is moved longitudinally inward or outward relative to the main drum body and the flexible shaft subassembly while the guide plate is pressed down and the at least one rotational force transmitting pin is slid by the drive shaft or a compression and torsion spring or a compression spring in the axial straight and spiral groove. The receiver is configured to receive the rotational driving force from the drive shaft and transmit the rotational driving force through the flexible shaft member to the adapter such that the main drum body, the bushing member and the flexible shaft subassembly are rotated about an axis.

In certain embodiments, a limit block secured in a printer is configured to press the guide plate and the bushing member pressing a compression spring down together with the flexible shaft subassembly pressing a compression and torsion spring via the W shape plate spring connection controller during installation.

In certain embodiments, the at least one rotational force transmitting pin, configured to slide in the straight section of the axial straight and spiral groove disposed on the bushing member, is stopped at a middle corner of the groove by a pressing force of the compression and torsion spring upon completion of installation.

In certain embodiments, the at least one rotational force transmitting pin rotated by the drive shaft is configured to slide from a middle corner of the axial straight and spiral groove to an upper end of the spiral section of the groove and pull the bushing member inward pressing the compression spring further such that an upper end of the bushing member disengages the guide plate, an upper part of a hole of the bushing member disengages the receiver post and the adapter transmits the rotational driving force through the bushing member to the main drum body during working operation of a printer.

In certain embodiments, the main drum body and the bushing member are connected by a plurality of straight, non-tapered, interval, longitudinal spline grooves in the main drum body and a plurality of straight, non-tapered, interval, longitudinal splines disposed on the bushing member configured to slide axially to each other and transmit the rotational driving force about the axis.

In certain embodiments, the plurality of straight, non-tapered, interval, longitudinal spline grooves and the plurality of straight, non-tapered, interval, longitudinal splines connecting the main drum body and the bushing member have a free rotating angle $\alpha$ in which $\alpha$ is from 0° to less than or equal to 30°.

In certain embodiments, the flexible shaft subassembly is rotated in a counterclockwise direction by a torsion of the compression and torsion spring, and the at least one rotational force transmitting pin is configured to slide in the spiral section of the groove and push the bushing member outward, when the receiver disposed on the main drum body is disengaged with the drive shaft during detachment.

In certain embodiments, the bushing member is pushed outward by a pressing force of the compression spring such that the at least one rotational force transmitting pin is configured to slide in the straight section of the groove and both side constraints of the W shape plate spring connection controller are released during detachment.

In certain embodiments, the main drum body is part of a photosensitive drum.

In certain embodiments, the photosensitive drum is part of a toner cartridge.

In certain embodiments, the flexible shaft member is made of an elastic or elastomeric material selected from metal wire, cross-linked latex rubber, cross-linked synthetic elastomers, non-cross-linked synthetic elastomers, natural rubber, thermoplastic elastomers, PVC, synthetic rubber, polyurethane, latex rubber, synthetic latex rubber, and polyolefins.

Various advantages of this disclosure will become apparent to those skilled in the art from the following detailed description, when read in light of the accompanying drawings.

DETAILED DESCRIPTION

This disclosure is not limited to the particular apparatus, assemblies, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In consideration of the figures, it is to be understood for purposes of clarity certain details of construction and/or operation are not provided in view of such details being conventional and well within the skill of the art upon disclosure of the document described herein.

The drive coupling and transmitting assembly of the present disclosure is advantageous in many respects, such as the easy installation and detachment of the cartridge from a printer when compared to conventional drive shaft and coupling assemblies. Since there are deviations of manufacture and installation both angular displacement and axial misalignment may happen between printer and a cartridge. The flexible shaft connection of the drive coupling and transmitting assembly supports both angular displacement and axial misalignment, however, certain conventional assemblies permit only angular displacements or axial misalignments while some conventional assemblies are unable to support any such displacements. Moreover, conventional assemblies generate more noise (shock and vibration) than the flexible shaft of the drive coupling and transmitting assembly of the present disclosure. The flexible shaft connection can naturally absorb shock and dampen vibration that could reduce printing quality while the printer is working. The flexible shaft connection has constant angular velocity, however, universal joints and conventional assemblies may produce fluctuating motion that could reduce printing quality while the printer is working. Further, the coupling and transmitting assembly has higher efficiency than the universal joints and conventional assemblies, among other desirable features as described herein.

It is contemplated by the present disclosure that the drive coupling and transmitting assembly may be used with any suitable electrostatographic image forming device.

Figure 1:
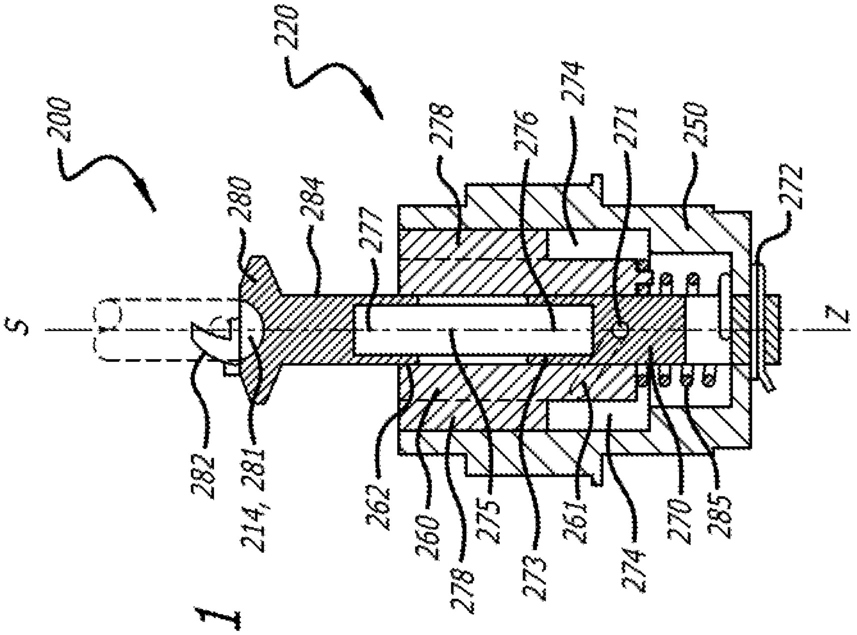
FIG. 1 is a cross-sectional view along the line 1-1 in FIG. 4 of the drive coupling and transmitting assembly in accordance with an exemplary embodiment of the present disclosure positioned with respect to a main drum body.
Figure 3:
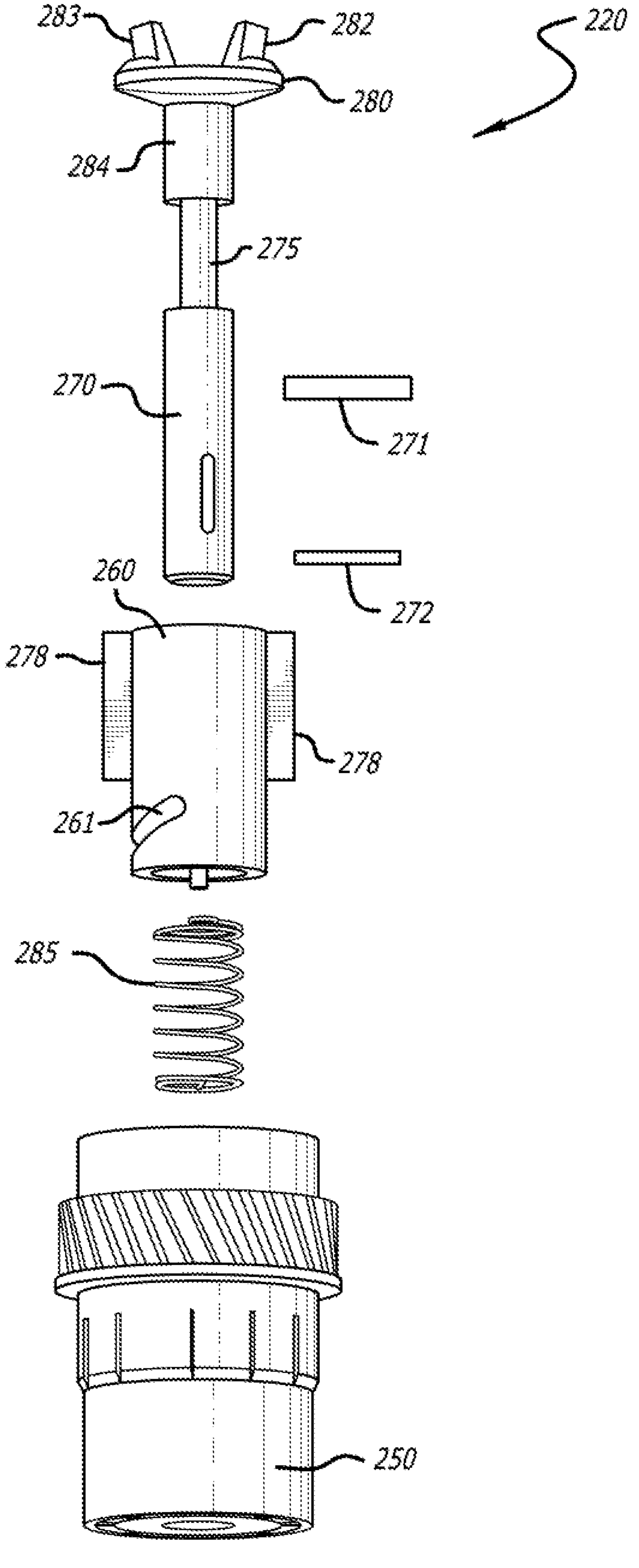
FIG. 3 is an exploded view of the main drum body and the drive coupling and transmitting assembly shown in FIG. 2.

Referring to FIG. 1, a drive coupling and transmitting assembly 200 in accordance with an embodiment of the present disclosure will be described. The drive coupling and transmitting assembly 200 includes a drive shaft 210 configured to transmit a rotational driving force and a coupling member 220. The coupling member 220 includes a main drum body 250, a receiver 280, an adapter 270, a shaft member 275 extended between the adapter 270 and the receiver 280 (an assembly of above three members 270, 275, 280 is a flexible shaft subassembly below), a compression and torsion spring 285 and a bushing member 260 installed slidably between the main drum body 250 and the flexible shaft subassembly. A first end 277 of the shaft member 275 is secured to a receiver post 284 and a second end 276 of the shaft member 275 is secured to an upper end 273 of the adapter 270.

The shaft member 275 can be manufactured from any suitable elastic or elastomeric material such that the shaft member 275 is flexible (flexible shaft 275 below). For example, the elastomeric material may be selected from metal wire, cross-linked latex rubber, cross-linked synthetic elastomers, non-cross-linked synthetic elastomers, natural rubber, thermoplastic elastomers, PVC, synthetic rubber, polyurethane, latex rubber, synthetic latex rubber, polyolefins, and the like.

Figure 2:
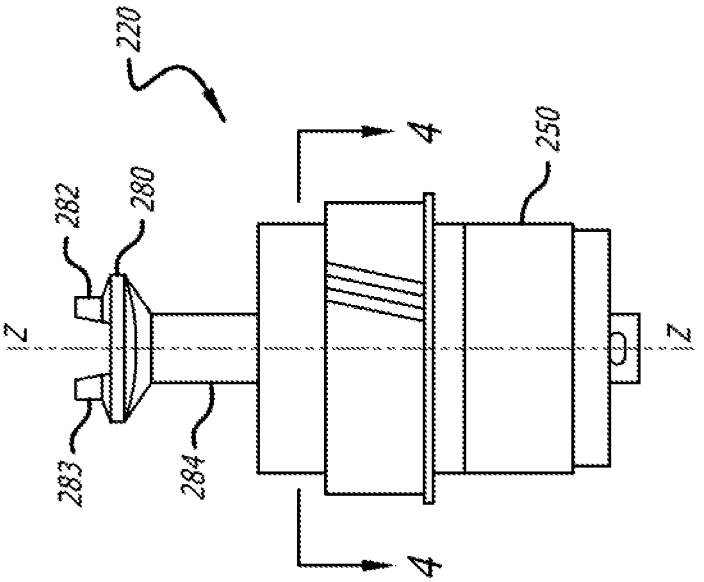
FIG. 2 is a front view of the main drum body and the drive coupling and transmitting assembly according to the present disclosure.
Figure 6:
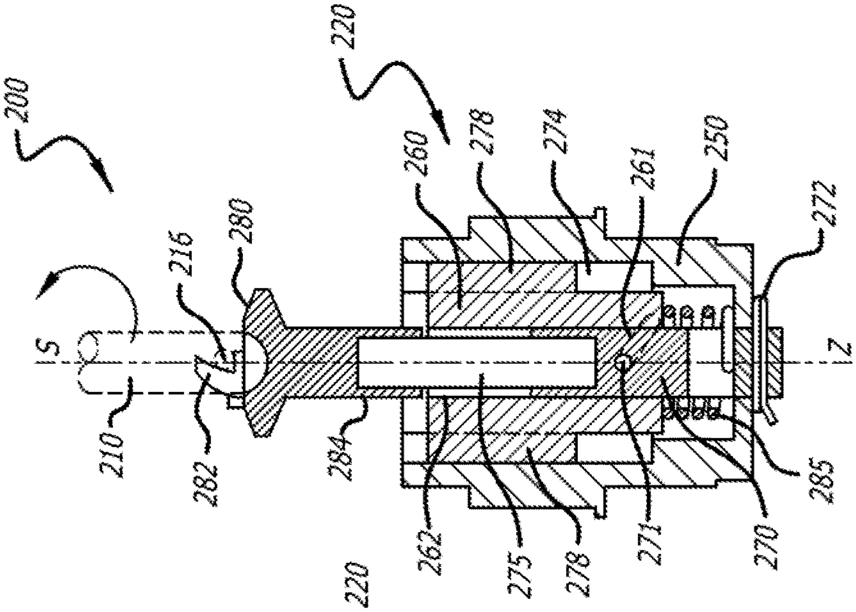
FIG. 6 is a cross-sectional view of the drive coupling and transmitting assembly showing the assembly is on the printing status.
Figure 5:
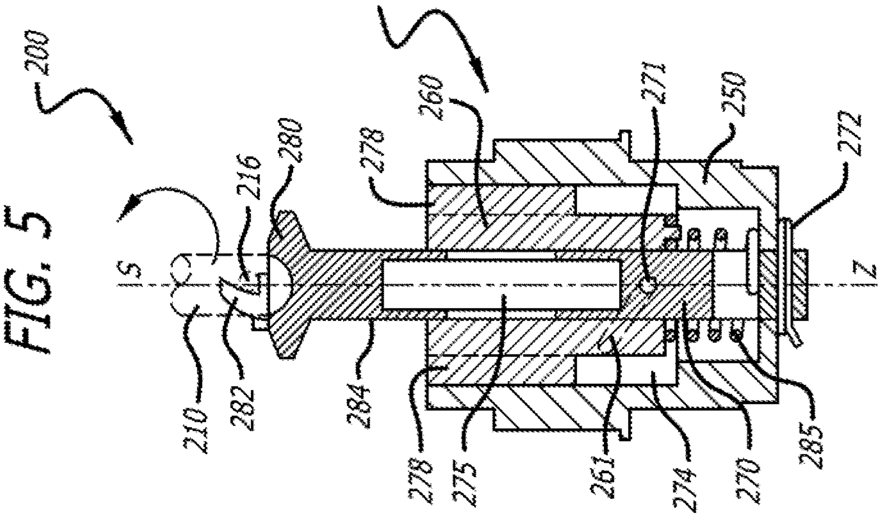
FIG. 5 is a cross-sectional view of the drive coupling and transmitting assembly showing the assembly moved in position in a printer and into engagement with the drive shaft.
Figure 4:
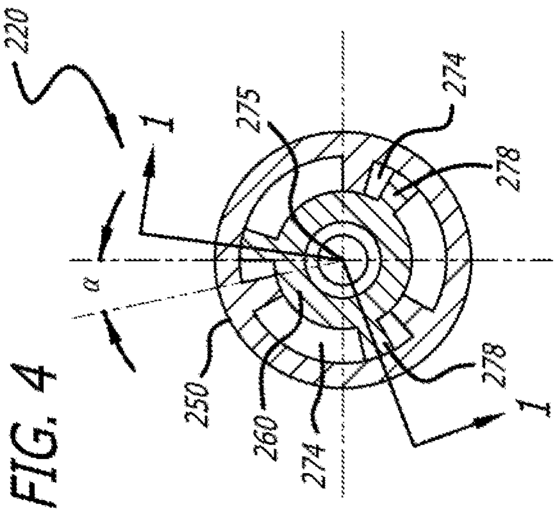
FIG. 4 is a cross-sectional view along the line 4-4 in FIG. 2 showing a bushing member positioned with respect to a shaft member and the main drum body.
Figure 8:
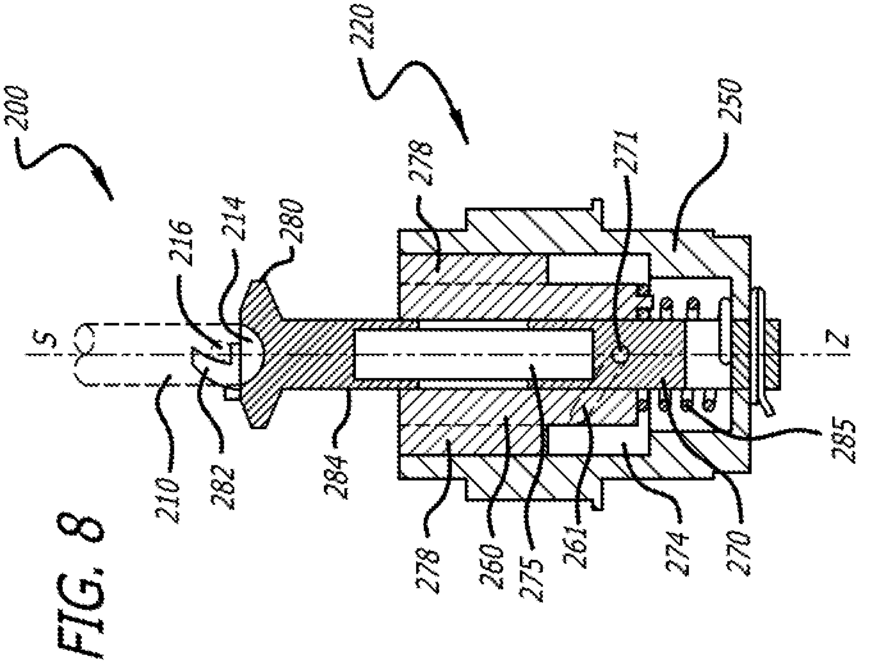
FIG. 8 is a cross-sectional view of the drive coupling and transmitting assembly showing the assembly is restored to original status after the printer stops printing.
Figure 7:
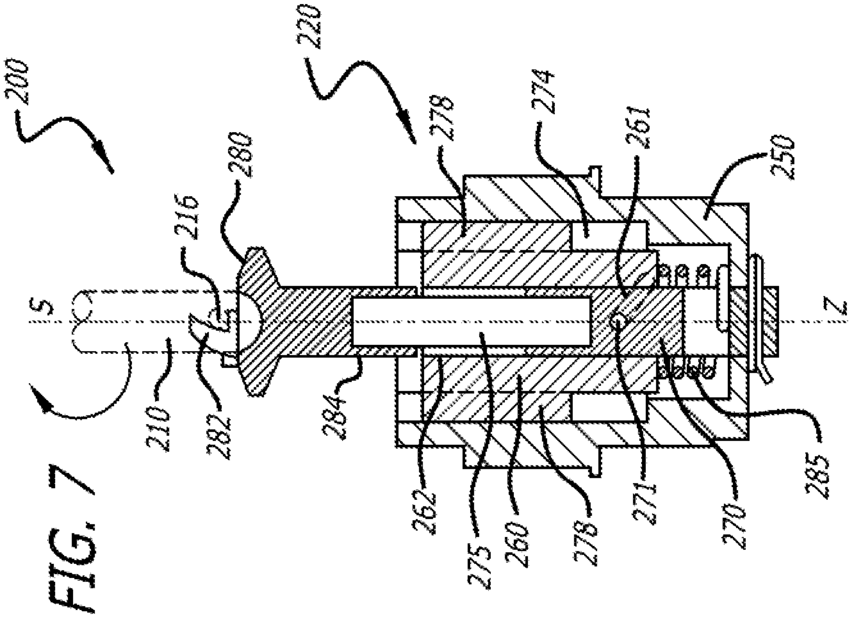
FIG. 7 is a cross-sectional view of the drive coupling and transmitting assembly shown on the status when the printer stops printing.

Referring now to FIGS. 2 and 5, the main drum body 250, the bushing member 260 and the flexible shaft subassembly 270, 275, 280 are rotated about axis Z. The main drive shaft 210 is configured in a printer and drives rotation about S by the motor of the printer. The receiver 280 with two engaging teeth 282, 283 is used to receive a rotational driving force from the drive shaft 210 and transmit the rotational driving force through flexible shaft 275 to the adapter 270. The adapter 270 is installed slidably in the bushing member 260 and configured with rotational force transmitting pins 271 to engage with a spiral groove 261 disposed on the bushing member 260. The bushing member 260 may be moved longitudinally inward or outward while the pin 271 is rotated by the drive shaft 210 or the compression and torsion spring 285 in the spiral groove 261 in a clockwise or counterclockwise direction. Once the pin 271 is rotated by the drive shaft 210 and slides to an upper end of the spiral groove 261, the adapter 270 transmits the rotational driving force to the bushing member 260 (FIG. 6). The main drum body 250 and the bushing member 260 are connected by a plurality of straight, non-tapered, interval, longitudinal spline grooves 274 and a plurality of straight, non-tapered, interval, longitudinal splines 278 and slide axially to each other and transmit the rotational driving force about axis Z. The plurality of straight, non-tapered, interval, longitudinal spline grooves 274 and the plurality of straight, non-tapered, interval, longitudinal splines 278 between the main drum body 250 and the bushing member 260 have a free rotating angle α (FIG. 4) in which α is from 0° to less than or equal to 90°. A dowel 272 is configured on the lower end of the adapter 270 to limit the outward position of the flexible shaft subassembly longitudinally.

Figure 11:
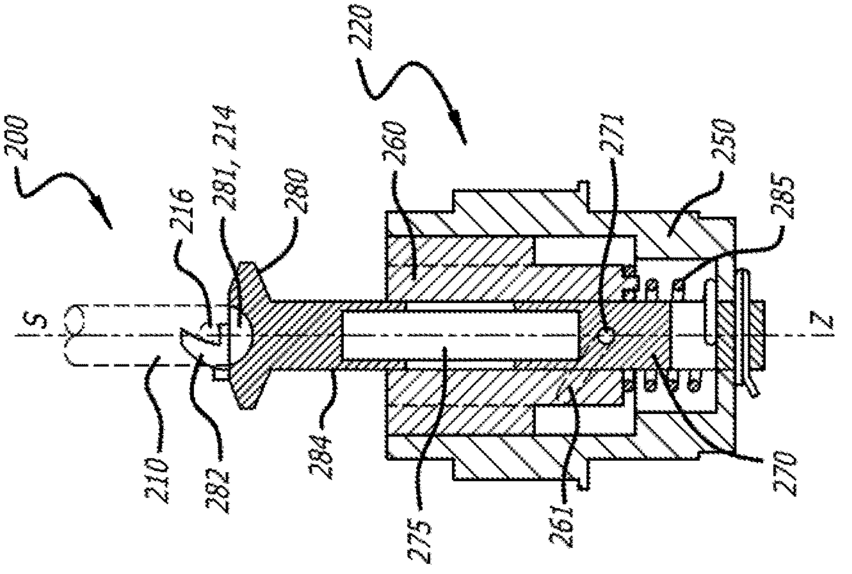
FIGS. 9-11 are sequential cross-sectional views illustrating installation engagement of an exemplary drive shaft with the drive coupling and transmitting assembly of the present disclosure.
Figure 10:
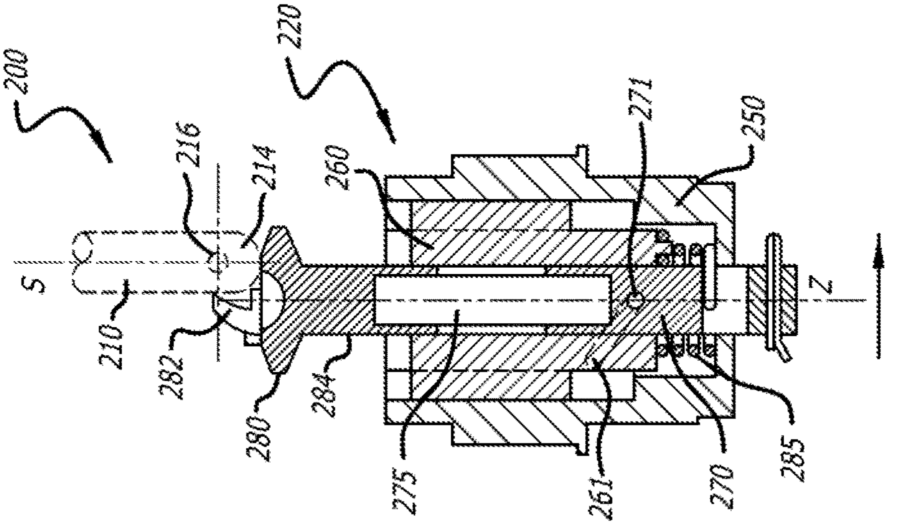
Figure 9:
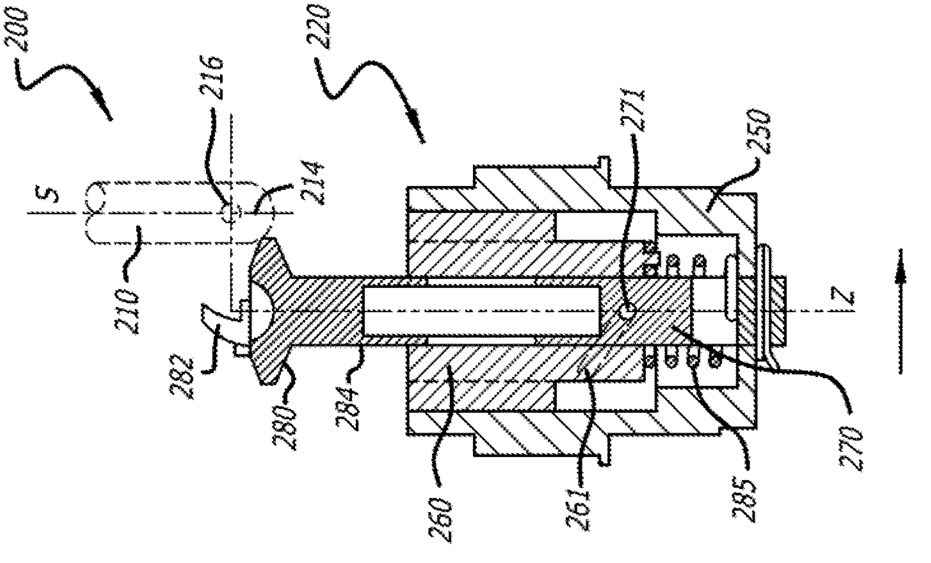

Having described the general components of the drive coupling and transmitting assembly 200, operation thereof will be described with reference to FIGS. 5-14. Referring first to FIGS. 9-11 installation of the main drum body 250 relative to the drive shaft 210 will be described. When installing the cartridge (not shown) with the main drum body 250 into the printer (not shown), the outer edge of the receiver 280 on the main drum body 250 is in contact with the drive shaft 210 first, as illustrated in FIG. 9. The main drum body 250 is continually moved toward the drive shaft 210 as indicated by the arrow in FIG. 10 and the drive shaft free end 214 pushes the receiver 280 together with the flexible shaft subassembly 270, 275, 280 and the bushing member 260 pressing the compression and torsion spring 285 longitudinally inward. In such circumstances, there is not any relative movement between the bushing member 260 and the flexible shaft subassembly 270, 275, 280. When the main drum body 250 is moved to the printing working position in FIG. 11, the drive shaft free end 214 and drive pin 216 are received partially into the chamber 281 of the receiver 280. The receiver 280 of the main drum body 250 has moved into engagement with the drive shaft 210 and the cartridge (not shown) has completed installation into the printer (not shown).

As illustrated in FIGS. 5-8, when the printer (not shown) is working, the adapter 270 is rotated by the drive shaft 210 in a clockwise direction and the bushing member 260 may rotate in the free rotating angle α first ending when the plurality of straight, non-tapered, interval, longitudinal splines 278 of bushing member 260 are in contact with the plurality of straight, non-tapered, interval, longitudinal spline grooves 274 of the main drum body 250. The pin 271 on the adapter 270 then slides from a lower end of the spiral groove 261 and pulls the bushing member 260 inward pressing and torquing the the compression and torsion spring 285 until the pin 271 is stopped by an upper end of the spiral groove 261 (FIG. 6). The drive shaft 210 (rotating continually) will transmit the rotational driving force through the receiver 280, flexible shaft 275, the adapter 270 and the bushing member 260 to the main drum body 250 and drive the cartridge (not shown) in working condition. In the meantime, the upper hole 262 of the bushing member 260 has disengaged the receiver post 284 (FIG. 6). The limits of the receiver 280 are lifted and the advantage of the flexible shaft connection will be exerted to overcome installation and manufacture errors while the printer (not shown) is working. When the printer (not shown) stops working/printing (FIGS. 7-8), the drive shaft 210 loses the drive power and the torsion of the compression and torsion spring 285 drives the adapter 270 with the flexible shaft subassembly 270, 275, 280 rotating the drive shaft 210 in a counterclockwise direction (FIG. 7) and the pin 271 sliding from an upper end of the spiral groove 261 of the bushing member 260 to the lower end of the spiral groove 261. The bushing member 260 is pushed back outward and the original status of the coupling and transmitting assembly 200 is restored in FIG. 8 (the status similar as FIG. 11) and the constraint between the drive pin 216 of the drive shaft 210 and the engaging teeth 282, 283 on the receiver 280 has been liberated.

Figure 14:
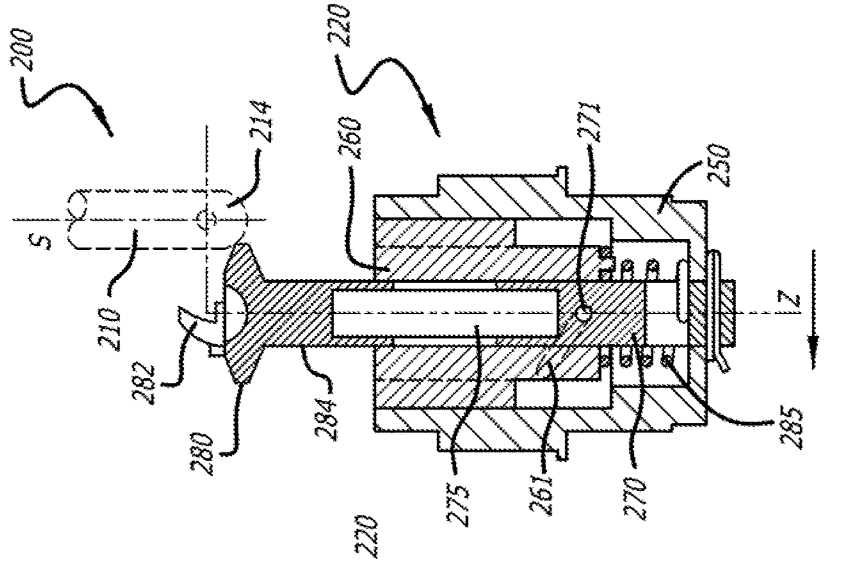
FIGS. 12-14 are sequential cross-sectional views illustrating detachment dis-engagement of the exemplary drive shaft with the drive coupling and transmitting assembly of the present disclosure.
Figure 13:
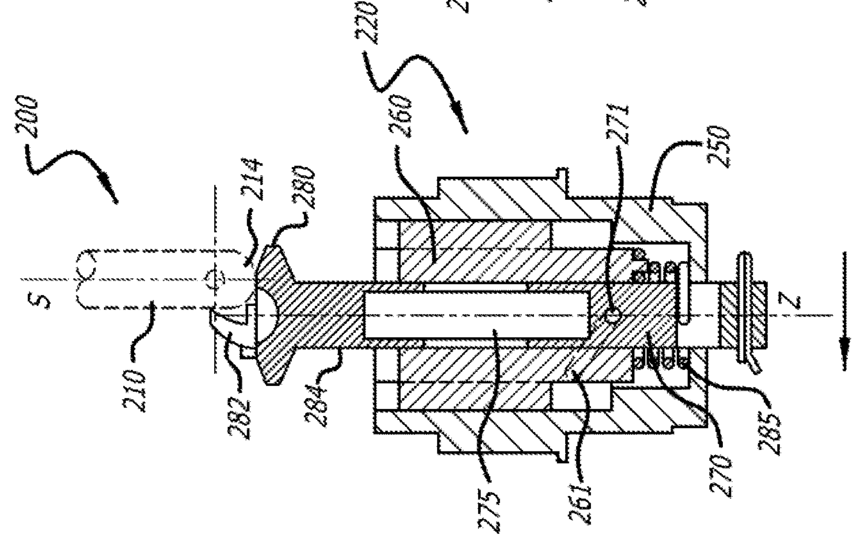
Figure 12:
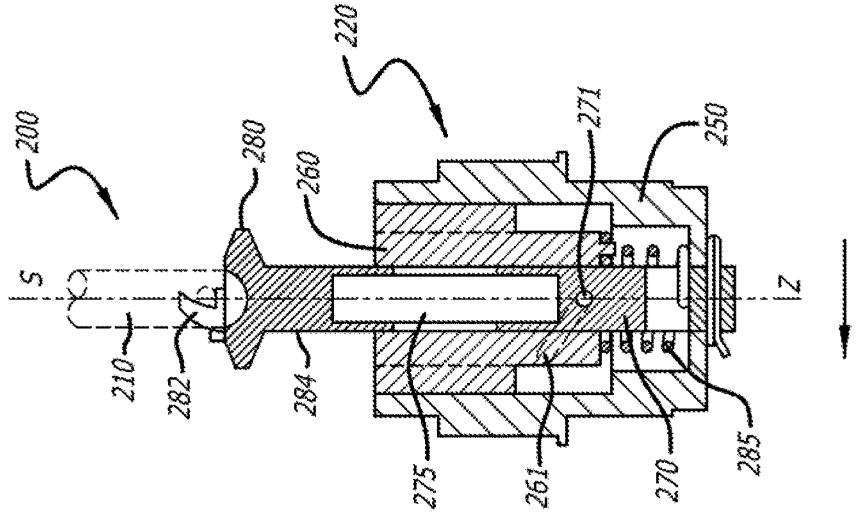

As illustrated in FIGS. 12-14, detachment is accomplished by moving the main drum body 250 in the opposite direction. Referring to FIG. 12 (same as FIGS. 8 and 11), the printer (not shown) stops working and the cartridge (not shown) is ready to be detached from the printer. The main drum body 250 of the cartridge is moved outward and detached from the drive shaft 210 as indicated by the arrow in FIG. 13. Generally, the drive shaft free end 214 pushes the receiver 280 together with the flexible shaft subassembly 270, 275, 280 and the bushing 260 pressing the compression and torsion spring 285 longitudinally inward. In such circumstances, there is not any relative movement between the bushing member 260 and the flexible shaft assembly 270, 275, 280. However, when the rotation of the drive shaft 210 is stopped randomly at an extraordinary position such that the extended line of the sectional view center of the engaging teeth 282, 283 on the receiver 280 is parallel or approximately parallel with the detachment direction, the inside engaging tooth of the detachment direction will be blocked by the drive shaft free end 214 so that the main drum body 250 cannot be conveniently detached from the printer. In such circumstances, as described above, as the constraint between the drive pin 216 of the drive shaft 210 and the engaging teeth 282, 283 on the receiver 280 have been liberated by the torsion of the compression and torsion spring 285, the main drum body 250 is moved outward and the inside engaging tooth of the detachment direction on the receiver 280 is able to slide and shift a small angle conveniently and escape from the drive shaft free end 214 pushing the receiver 280 together with the flexible shaft subassembly 270, 275, 280 and the bushing member 260 pressing the compression and torsion spring 285 longitudinally inward. The main drum body 250 is continually moved outward and detached from the drive shaft 210, as indicated by the arrow in FIG. 14, and the cartridge is detached from the printer.

In another exemplary embodiment of the present disclosure, a weak compression and torsion spring 285 is used as shown in FIG. 1. When installing and the printer (not shown) is working, the status is similar to the description above for the first embodiment. However, when the printer stops working/printing (FIG. 6), as the drive shaft 210 loses drive power, the torsion of the compression and torsion spring 285 is not enough to drive the adapter 270 with the flexible shaft subassembly 270, 275, 280 rotating the drive shaft 210 in a counterclockwise direction. The bushing member 260 remains in the status shown in FIG. 6.

When detaching, the receiver 280 may swing a small angle (0-10 degrees) by the elasticity of the flexible shaft 275, producing a longitudinal force that pushes the receiver 280 together with the flexible shaft subassembly 270, 275, 280 and the bushing member 260 pressing the compression and torsion spring 285 longitudinally inward and the engaging teeth 282, 283 escape from the barrier so that the cartridge is detached from the printer smoothly.

Figure 15:
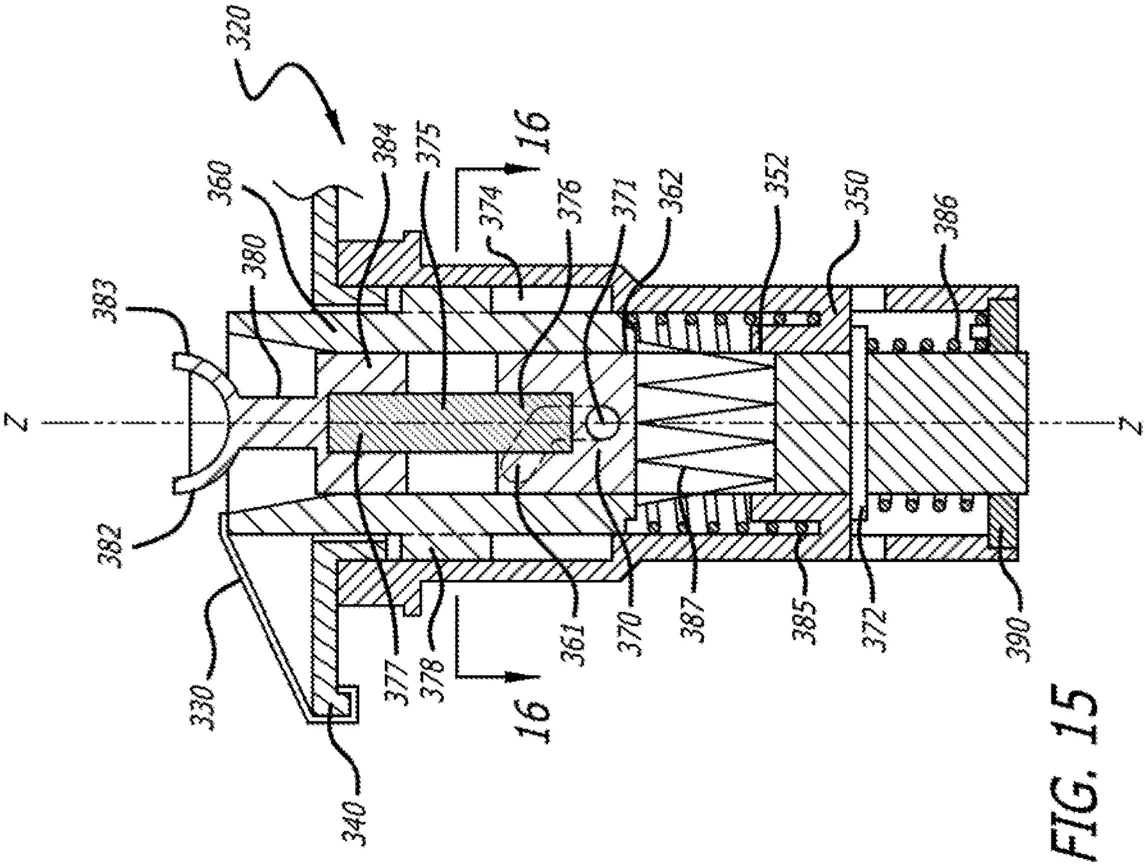
FIG. 15 is a cross-sectional view along the line 15-15 in FIG. 16 showing a drive coupling and transmitting assembly in accordance with another exemplary embodiment of the present disclosure positioned with respect to a main drum body.
Figure 20:
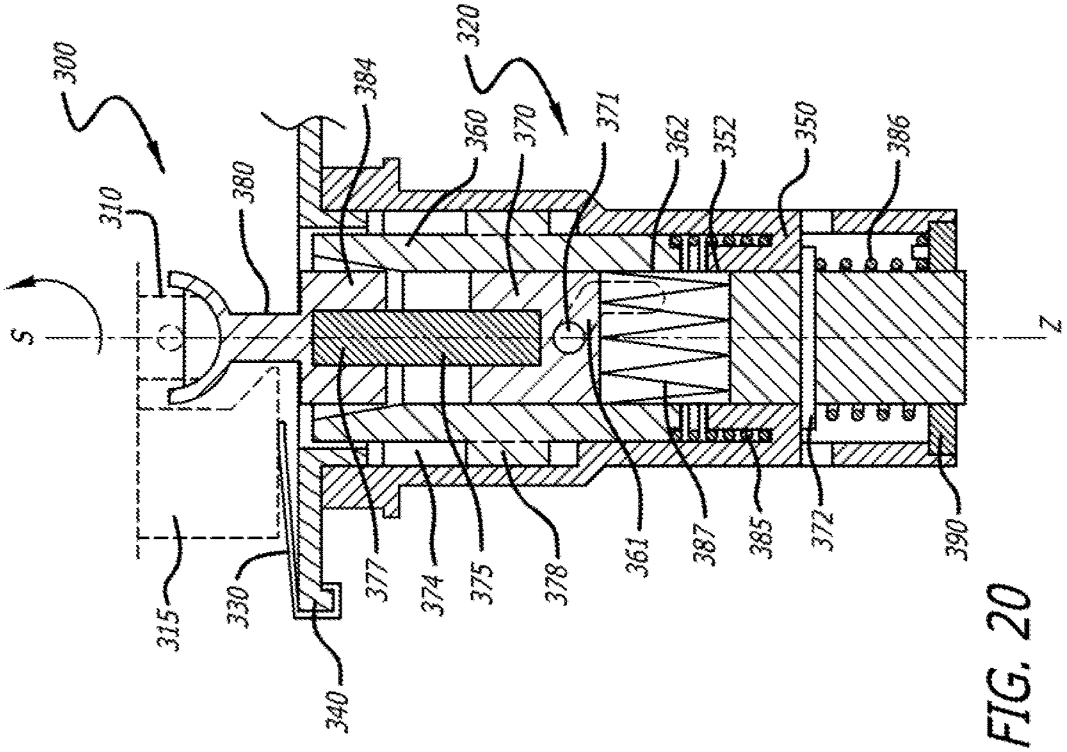
FIG. 20 is a sequential cross-sectional view illustrating the exemplary embodiment of the present disclosure is on working status of the printer.

Referring now to FIGS. 15 and 20, another exemplary embodiment of the drive coupling and transmitting assembly 300 includes a drive shaft 310 configured to transmit a rotational driving force and a coupling member 320. The coupling member 320 includes a main drum body 350, a guide plate 330 mounted on a bearing frame 340 of the main drum body 350, a receiver 380, an adapter 370, a shaft member 375 extended between the adapter 370 and the receiver 380 (an assembly of above three members 370, 375, 380 is a flexible shaft subassembly below), a compression spring 385, a compression and torsion spring 386, a W shape plate spring 387 and a bushing member 360, installed slidably between the main drum body 350 and the flexible shaft subassembly. A first end 377 of the shaft member 375 is secured to the receiver post 384 and a second end 376 of the shaft member 375 is secured to the upper end of the adapter 370.

The shaft member 375 can be manufactured from any suitable elastic or elastomeric material such that the shaft member 375 is flexible (flexible shaft 375 below). For example, the elastomeric material may be selected from metal wire, cross-linked latex rubber, cross-linked synthetic elastomers, non-cross-linked synthetic elastomers, natural rubber, thermoplastic elastomers, PVC, synthetic rubber, polyurethane, latex rubber, synthetic latex rubber, polyolefins, and the like.

Figure 17:
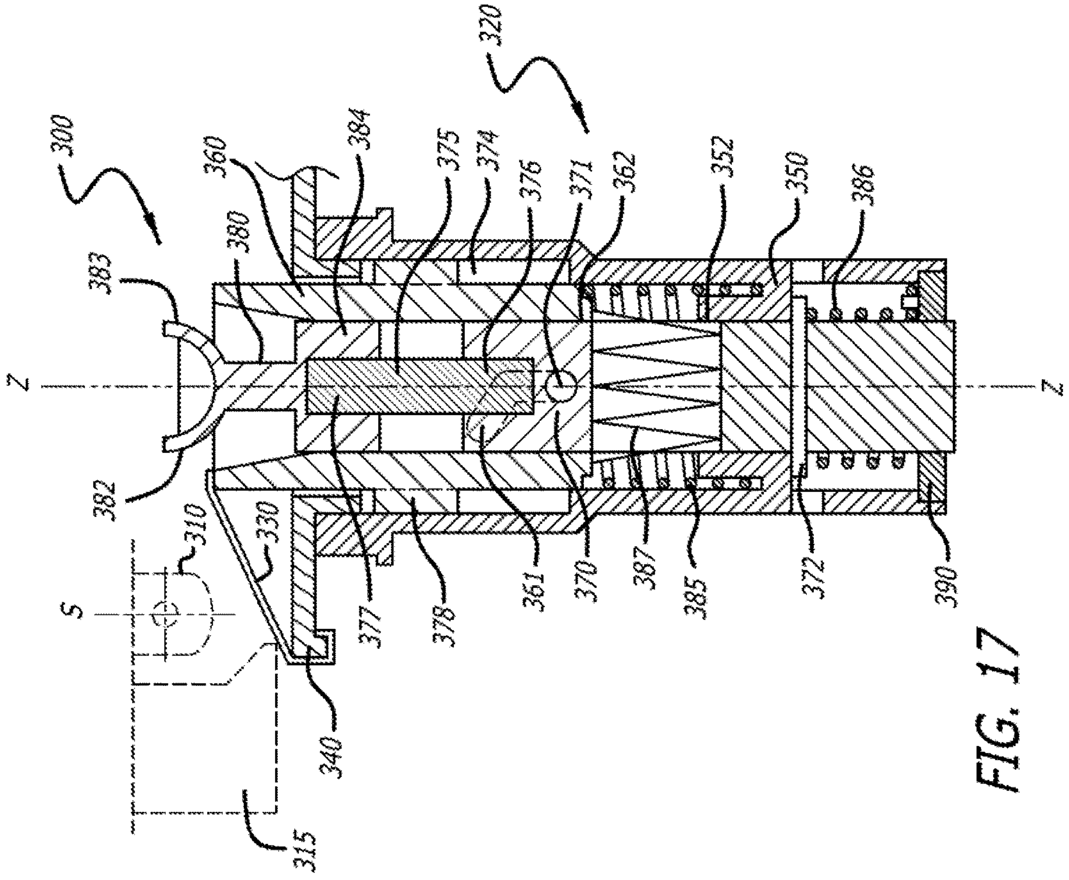
FIG. 17 is a sequential cross-sectional view illustrating installation of the main drum body into the printer and a guide plate contacting an exemplary limit block secured in the printer.

As illustrated in FIGS. 15 and 17, the main drum body 350, the bushing member 360 and the flexible shaft subassembly 370, 375, 380 are rotated about axis Z. A main drive shaft 310 is configured in a printer and drives rotation about S by the motor of the printer. The receiver 380 with two engaging teeth 382, 383 is used to receive a rotational driving force from the drive shaft 310 and transmit the rotational driving force through flexible shaft 375 to the adapter 370. The adapter 370 is slidably disposed in the bushing member 360 and configured with rotational force transmitting pins 371 to engage with an axial straight and spiral groove 361 on the bushing member 360. The bushing member 360 may be moved, relative to the main drum body 350 and the flexible shaft subassembly 370, 375, 380, longitudinally inward or outward while the guide plate 330 is pressed down and/or the pin 371 is slid in the axial straight and spiral groove 361.

Figure 18:
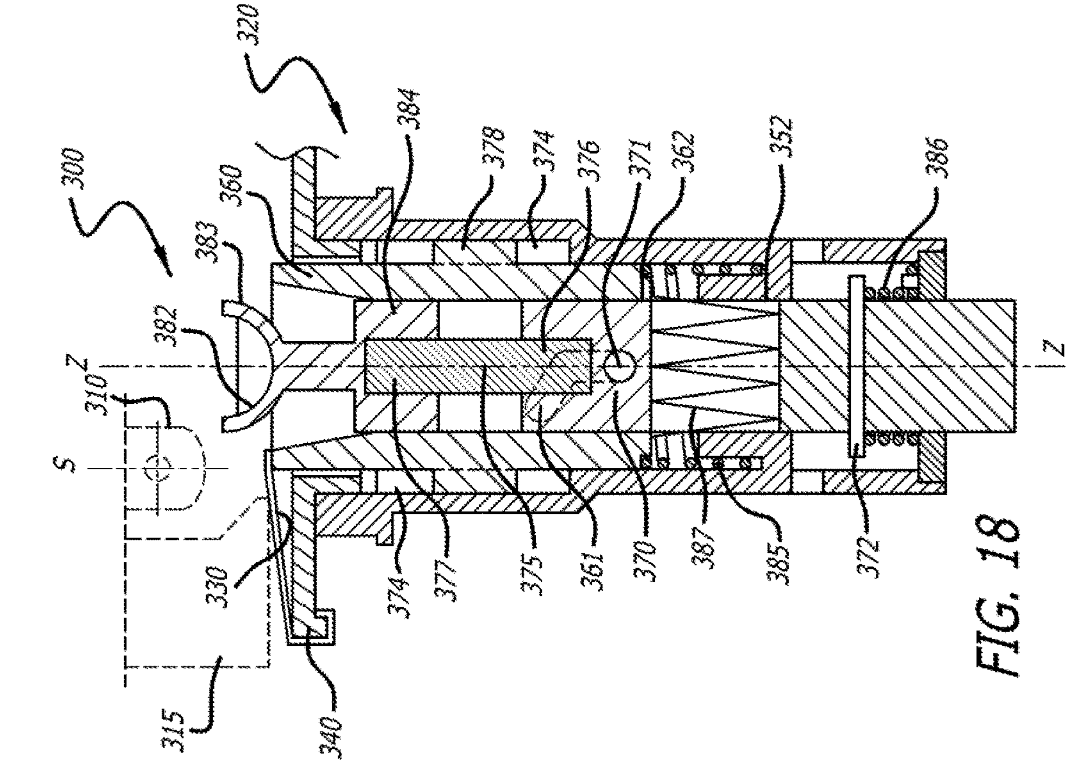
FIG. 18 is a sequential cross-sectional view illustrating installation of the main drum body into the printer and the exemplary limit block pressing the guide plate and the bushing member down together with a flexible shaft subassembly.
Figure 19:
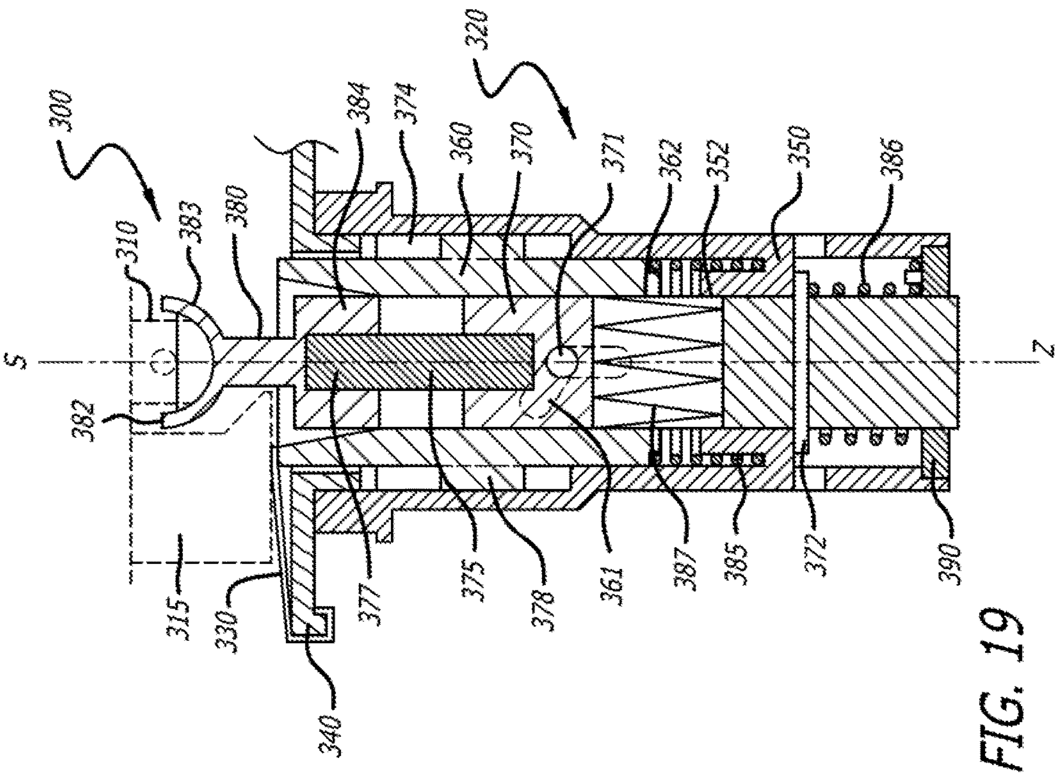
FIG. 19 is a sequential cross-sectional view illustrating installation of the main drum body installed into the printer.

When installing the cartridge into the printer, a limit block 315 secured in the printer will press the guide plate 330 and bushing member 360 pressing the compression spring 385 down together with the flexible shaft subassembly 370, 375, 380 pressing the compression and torsion spring 386 by means of the W shape plate spring 387. The W shape plate spring 387 is configured on the adapter as a connection controller (FIGS. 17-18). When continuously pressing the bushing member 360 down, once both sides of the W shape plate spring 387 are compressed by a first hole 352 in the main drum body 350 and enter a second hole 362 in the bushing 360, the flexible shaft subassembly 370, 375, 380 will be returned by the pressing force of the compression and torsion spring 386. The pins 371 sliding in the straight section of the axial straight and spiral groove 361 on the bushing member 360 are stopped at the middle corner of the groove 361 such that installation of the cartridge is completed and the receiver 380 is configured to engage with the drive shaft 310 (FIG. 19).

Figure 16:
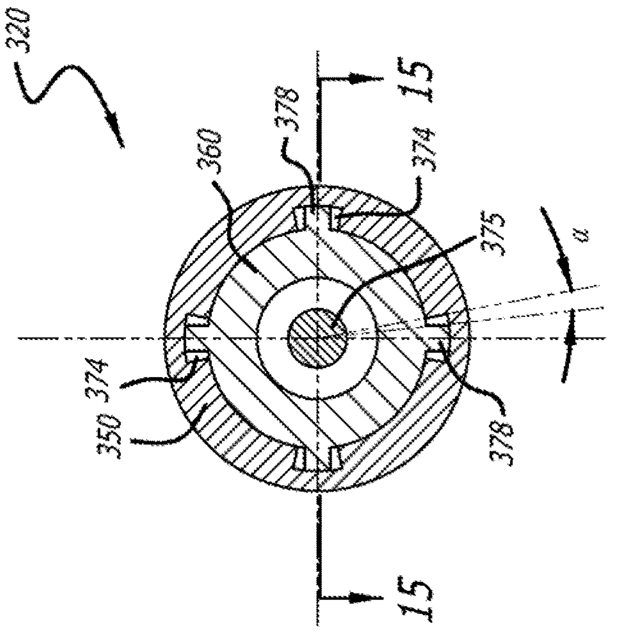
FIG. 16 is a cross-sectional view along the line 16-16 in FIG. 15 showing a bushing member positioned with respect to a shaft member and the main drum body.

Once the printer is working, the pins 371 rotated by the drive shaft 310 slide from the middle corner of the axial straight and spiral groove 361 to an upper end of the spiral section of the groove 361, pull the bushing member 360 inward pressing the compression spring further and the upper end of the bushing member 360 disengages the guide plate 330, and the adapter 370 transmits the rotational driving force through the bushing member 360 to the main drum body 350 (FIG. 20). In the meantime, the upper part of the hole 362 of the bushing member 360 has disengaged the receiver post 384 (FIG. 20). The limits of the receiver 380 are lifted and the advantage of the flexible shaft connection will be exerted to overcome installation and manufacture errors while the printer (not shown) is working. The main drum body 350 and the bushing member 360 are connected by the plurality of straight, non-tapered, interval, longitudinal spline grooves 374 in the main drum body 350 and the plurality of straight, non-tapered, interval, longitudinal splines 378 on the bushing member 360 and slide axially to each other and transmit the rotational driving force about axis Z. The plurality of straight, non-tapered, interval, longitudinal spline grooves 374 and the plurality of straight, non-tapered, interval, longitudinal splines 378 between the main drum body 350 and the bushing member 360 have a free rotating angle α (FIG. 16) in which α is from 0° to less than or equal to 30°. A dowel 372 is configured to mount the upper end of the compression and torsion spring 386 and limit the outward position of the flexible shaft subassembly 370, 375, 380 longitudinally. An end cover 390 is configured to mount the lower end of the compression and torsion spring 386 (FIG. 15).

Detachment of the coupling and transmitting assembly 300 is similar to the other exemplary embodiments described above. Once the receiver 380 on the main drum body 350 of the cartridge is disengaged with the drive shaft 310, the flexible shaft subassembly 370, 375, 380 is rotated in a counterclockwise direction by the torsion of the compression and torsion spring 386, the pins 371 sliding in the spiral section of the groove 361 and pushing the bushing member 360 outward. The bushing member 360 is then pushed back outward by the pressing force of the compression spring 385 with the pins 371 sliding in the straight section of the groove 361 and both side constraints (configured by the hole 362 in the bushing 360) of the W shape plate spring connection controller 387 are released. The original status of the drive coupling and transmitting assembly 300 is restored as shown in FIG. 15.

These and other advantages of the present disclosure will be apparent to those skilled in the art from the foregoing specification. Accordingly, it will be recognized by those skilled in the art that changes or modifications may be made to the above-described embodiments without departing from the broad inventive concepts of the disclosure. It should therefore be understood that this disclosure is not limited to the particular embodiments described herein, but is intended to include all changes and modifications that are within the scope and spirit of the invention as defined in the claims.

What is claimed is:

1. A drive coupling and transmitting assembly, comprising:

a drive shaft configured to transmit a rotational driving force; and a coupling member comprising:

a main drum body of variable size and shape having a flexible shaft subassembly including: a receiver having at least two engaging teeth, an adapter, and a flexible shaft member extended between the adapter and the receiver, wherein a first end of the shaft member is secured to a receiver post and a second end of the shaft member is secured to an upper end of the adapter;

a bushing member slidably disposed between the main drum body and the flexible shaft subassembly, wherein the adapter is slidably disposed in the bushing member and configured with at least one rotational force transmitting pin to engage with a spiral groove disposed on the bushing member such that the bushing member is moved longitudinally inward or outward while installing or detaching the main drum body and the at least one rotational force transmitting pin is rotated by the drive shaft or a compression and torsion spring in the spiral groove in a clockwise or counterclockwise direction;

wherein the receiver is configured to receive the rotational driving force from the drive shaft and transmit the rotational driving force through the flexible shaft member to the adapter such that the main drum body, the bushing member and the flexible shaft subassembly are rotated about an axis.

2. The drive coupling and transmitting assembly of claim 1, wherein the adapter is configured to transmit the rotational driving force to the bushing member when the at least one rotational force transmitting pin is rotated by the drive shaft and is slid to an upper end of the spiral groove.

3. The drive coupling and transmitting assembly of claim 1, wherein the main drum body and the bushing member are connected by a plurality of straight, non-tapered, interval, longitudinal spline grooves and a plurality of straight, non-tapered, interval, longitudinal splines configured to slide axially to each other and transmit the rotational driving force about the axis.

4. The drive coupling and transmitting assembly of claim 3, wherein the plurality of straight, non-tapered, interval, longitudinal spline grooves and the plurality of straight, non-tapered, interval, longitudinal splines connecting the main drum body and the bushing member have a free rotating angle α in which α is from 0° to less than or equal to 90°.

5. The drive coupling and transmitting assembly of claim 1, wherein the main drum body is configured to continually move toward the drive shaft and a drive shaft free end is configured to push the receiver together with the flexible shaft subassembly and the bushing member configured to press the compression and torsion spring longitudinally inward during installation.

6. The drive coupling and transmitting assembly of claim 1, wherein the receiver of the main drum body is configured to engage the drive shaft upon completion of installation.

7. The drive coupling and transmitting assembly of claim 1, wherein the adapter is rotated by the drive shaft in a clockwise direction and the bushing member is rotated first in a free rotating angle α when a plurality of straight, non-tapered, interval, longitudinal splines of the bushing member are in communication with the plurality of straight, non-tapered, interval, longitudinal spline grooves of the main drum body during working operation of a printer.

8. The drive coupling and transmitting assembly of claim 1, wherein the at least one rotational force transmitting pin is configured to slide from a lower end of the spiral groove and pull the bushing member inward until the at least one rotational force transmitting pin is stopped by an upper end of the spiral groove such that an upper hole of the bushing member disengages the receiver post and the drive shaft transmits the rotational driving force through the flexible shaft subassembly and the bushing member to the main drum body during working operation of a printer.

9. The drive coupling and transmitting assembly of claim 1, wherein the main drum body is configured to be moved outward and detached from the drive shaft such that a drive shaft free end pushes the receiver together with the flexible shaft subassembly and the bushing member pressing the compression and torsion spring longitudinally inward during detachment.

10. The drive coupling and transmitting assembly of claim 1, wherein the receiver is configured to swing an angle from 0° to 10° degrees thereby producing a longitudinal force configured to push the receiver together with the flexible shaft subassembly and the bushing member configured to press the compression and torsion spring longitudinally inward during detachment.

11. The drive coupling and transmitting assembly of claim 1, wherein the main drum body is part of a photosensitive drum.

12. The drive coupling and transmitting assembly of claim 11, wherein the photosensitive drum is part of a toner cartridge.

13. The drive coupling and transmitting assembly of claim 1, wherein the flexible shaft member is made of an elastic or elastomeric material selected from metal wire, cross-linked latex rubber, cross-linked synthetic elastomers, non-cross-linked synthetic elastomers, natural rubber, thermoplastic elastomers, PVC, synthetic rubber, polyurethane, latex rubber, synthetic latex rubber, and polyolefins.

14. A drive coupling and transmitting assembly, comprising:

- a drive shaft configured to transmit a rotational driving force; and
- a coupling member comprising:
  - a main drum body of variable size and shape having a flexible shaft subassembly including: a receiver having at least two engaging teeth, an adapter, and a flexible shaft member extended between the adapter and the receiver, wherein a first end of the shaft member is secured to a receiver post and a second end of the shaft member is secured to an upper end of the adapter;
  - a guide plate mounted on a bearing frame of the main drum body;
  - a bushing member slidably disposed between the main drum body and the flexible shaft subassembly, wherein the adapter is slidably disposed in the bushing member, configured with at least one rotational force transmitting pin to engage with an axial straight and spiral groove disposed on the bushing member and configured with a W shape plate spring connection controller such that the bushing member is moved longitudinally inward or outward relative to the main drum body and the flexible shaft subassembly while the guide plate is pressed down and the at least one rotational force transmitting pin is slid by the drive shaft or a compression and torsion spring or a compression spring in the axial straight and spiral groove;
  - wherein the receiver is configured to receive the rotational driving force from the drive shaft and transmit the rotational driving force through the flexible shaft member to the adapter such that the main drum body, the bushing member and the flexible shaft subassembly are rotated about an axis.

15. The drive coupling and transmitting assembly of claim 14, wherein a limit block secured in a printer is configured to press the guide plate and the bushing member pressing the compression spring down together with the flexible shaft subassembly pressing the compression and torsion spring via the W shape plate spring connection controller during installation.

16. The drive coupling and transmitting assembly of claim 14, wherein the at least one rotational force transmitting pin, configured to slide in the straight section of the axial straight and spiral groove disposed on the bushing member, is stopped at a middle corner of the groove by a pressing force of the compression and torsion spring upon completion of installation.

17. The drive coupling and transmitting assembly of claim 14, wherein the at least one rotational force transmitting pin rotated by the drive shaft is configured to slide from a middle corner of the axial straight and spiral groove to an upper end of the spiral section of the groove and pull the bushing member inward pressing the compression spring further such that an upper end of the bushing member disengages the guide plate, an upper part of a hole of the bushing member disengages the receiver post and the adapter transmits the rotational driving force through the bushing member to the main drum body during working operation of a printer.

18. The drive coupling and transmitting assembly of claim 14, wherein the main drum body and the bushing member are connected by a plurality of straight, non-tapered, interval, longitudinal spline grooves in the main drum body and a plurality of straight, non-tapered, interval, longitudinal splines disposed on the bushing member configured to slide axially to each other and transmit the rotational driving force about the axis.

19. The drive coupling and transmitting assembly of claim 18, wherein the plurality of straight, non-tapered, interval, longitudinal spline grooves and the plurality of straight, non-tapered, interval, longitudinal splines connecting the main drum body and the bushing member have a free rotating angle $\alpha$ in which $\alpha$ is from 0° to less than or equal to 30°.

20. The drive coupling and transmitting assembly of claim 14, wherein the flexible shaft subassembly is rotated in a counterclockwise direction by a torsion of the compression and torsion spring, and the at least one rotational force transmitting pin is configured to slide in the spiral section of the groove and push the bushing member outward, when the receiver disposed on the main drum body is disengaged with the drive shaft during detachment.

21. The drive coupling and transmitting assembly of claim 20, wherein the bushing member is pushed outward by a pressing force of the compression spring such that the at least one rotational force transmitting pin is configured to slide in the straight section of the groove and both side constraints of the W shape plate spring connection controller are released during detachment.

22. The drive coupling and transmitting assembly of claim 14, wherein the main drum body is part of a photosensitive drum.

23. The drive coupling and transmitting assembly of claim 14, wherein the photosensitive drum is part of a toner cartridge.

24. The drive coupling and transmitting assembly of claim 14, wherein the flexible shaft member is made of an elastic or elastomeric material selected from metal wire, cross-linked latex rubber, cross-linked synthetic elastomers, non-cross-linked synthetic elastomers, natural rubber, thermoplastic elastomers, PVC, synthetic rubber, polyurethane, latex rubber, synthetic latex rubber, and polyolefins.

* * * * *